US011007734B2

(12) United States Patent
Boscaino et al.

(10) Patent No.: US 11,007,734 B2
(45) Date of Patent: May 18, 2021

(54) METHOD, CURING LINE, PROCESSING UNIT AND ASSOCIATED ELECTRONIC UNIT FOR CONTROLLING CURING APPARATUSES FOR TYRE PRODUCTION

(71) Applicant: PIRELLI TYRE S.P.A., Milan (IT)

(72) Inventors: Ivan Gildo Boscaino, Milan (IT); Marco Cantu', Milan (IT); Stefano Sangiovanni, Milan (IT); Giuseppe Morrone, Settimo Torinese (IT)

(73) Assignee: PIRELLI TYRE S.P.A., Milan (IT)

( * ) Notice: Subject to any disclaimer, the term of this patent is extended or adjusted under 35 U.S.C. 154(b) by 174 days.

(21) Appl. No.: 16/462,155

(22) PCT Filed: Nov. 29, 2017

(86) PCT No.: PCT/IB2017/057481
§ 371 (c)(1),
(2) Date: May 17, 2019

(87) PCT Pub. No.: WO2018/100501
PCT Pub. Date: Jun. 7, 2018

(65) Prior Publication Data
US 2019/0375174 A1     Dec. 12, 2019

(30) Foreign Application Priority Data

Nov. 30, 2016   (IT) .................. 102016000121323
Nov. 10, 2017   (EP) ..................... 17200962

(51) Int. Cl.
*B29D 30/06*     (2006.01)
*B29D 30/00*     (2006.01)
*B29D 30/10*     (2006.01)

(52) U.S. Cl.
CPC ..... *B29D 30/0016* (2013.01); *B29D 30/0601* (2013.01); *B29D 30/0603* (2013.01);
(Continued)

(58) Field of Classification Search
CPC ............. B29D 30/0016; B29D 30/005; B29D 30/0601; B29D 30/0603; B29D 2030/0675
See application file for complete search history.

(56) References Cited

U.S. PATENT DOCUMENTS 3,924,983 A * 12/1975 Barton ............... B29D 30/0603
425/38
6,702,912 B1 * 3/2004 Oku ...................... B29D 30/00
156/110.1
(Continued)

FOREIGN PATENT DOCUMENTS

CN     201471649 U    5/2010
CN     102514128 A    6/2012
(Continued)

OTHER PUBLICATIONS

Arguments filed with Demand for International Application No. PCT/IB2017/057481 filed on Nov. 29, 2017 on behalf of Pirelli Tyre S.P.A dated Sep. 24, 2018.
(Continued)

*Primary Examiner* — James P Mackey
(74) *Attorney, Agent, or Firm* — Steinfl + Bruno LLP (57) ABSTRACT

Methods for controlling curing apparatuses for tyre production, wherein the curing apparatuses are adapted to work on green tyres to obtain corresponding finished tyres, by acquiring, through a processing unit, initial parameters describing at least one of the shape and dimensions of the finished tyres; computing, through the processing unit, as a function of the initial parameters, first parameters describing the green tyres, the first parameters having at least one parameter representative of an axial height of the green tyres; acquiring, through the processing unit, second parameters describing the curing apparatuses, said second parameters having one or more parameters representative of dimensions of the
(Continued)

curing apparatuses; computing, through the processing unit, third parameters as a function of the first parameters and the second parameters, the third parameters having one or more parameters representative of positions taken by movable members included in the curing apparatuses; generating, through the processing unit, as a function of the third parameters, control signals for controlling the movable members of said curing apparatuses and for obtaining said finished tyres starting from the green tyres; sending the control signals from the processing unit to the curing apparatuses. Also disclosed are a curing line operating in accordance with the methods, a processing unit programmed for implementing the methods, and an electronic unit included in the processing unit.

13 Claims, 2 Drawing Sheets

(52) U.S. Cl.
CPC ............... *B29D 2030/0055* (2013.01); *B29D 2030/0675* (2013.01); *B29D 2030/105* (2013.01)

(56) References Cited

U.S. PATENT DOCUMENTS

| | | | | |
|---|---|---|---|---|
| 7,440,815 | B2* | 10/2008 | Hatakeyama | B29D 30/005 156/111 |
| 2004/0137099 | A1 | 7/2004 | Oku et al. | |
| 2011/0236514 | A1 | 9/2011 | Fujieda et al. | |
| 2012/0111464 | A1 | 5/2012 | Kimiya | |
| 2013/0251832 | A1 | 9/2013 | Agawa | |
| 2015/0246495 | A1 | 9/2015 | Onimatsu | |
| 2015/0328851 | A1 | 11/2015 | Cheng | |
| 2016/0082681 | A1 | 3/2016 | Takizawa et al. | |
| 2016/0332402 | A1 | 11/2016 | Nagai | |

FOREIGN PATENT DOCUMENTS

| | | | |
|---|---|---|---|
| CN | 103249547 | A | 8/2013 |
| CN | 203876103 | U | 10/2014 |
| CN | 104703785 | A | 6/2015 |
| CN | 204431591 | U | 7/2015 |
| CN | 104875303 | A | 9/2015 |
| CN | 104875304 | A | 9/2015 |
| CN | 104985727 | A | 10/2015 |
| CN | 105246662 | A | 1/2016 |
| CN | 106142609 | A | 11/2016 |
| CN | 106166808 | A | 11/2016 |
| CN | 206306335 | U | 7/2017 |
| EP | 0875364 | A2 | 11/1998 |
| EP | 1923190 | B1 | 1/2011 |
| EP | 1995083 | B1 | 8/2011 |
| EP | 3260283 | A1 | 12/2017 |
| EP | 3548265 | B1 | 9/2020 |
| IN | 20150359414 | A1 | 1/2017 |
| JP | H08142056 | A | 6/1996 |
| JP | 2013202877 | A | 10/2013 |
| KR | 20110035603 | A | 4/2011 |
| KR | 20130005827 | A | 1/2013 |
| RU | 2330757 | C2 | 8/2008 |
| RU | 2602528 | C2 | 11/2016 |
| WO | 01/00395 | A1 | 1/2001 |
| WO | 2011/021695 | A1 | 2/2011 |
| WO | 2012/085713 | A1 | 6/2012 |
| WO | 2012/176482 | A1 | 12/2012 |
| WO | 2014/192742 | A1 | 12/2014 |
| WO | 2018/100501 | A1 | 6/2018 |

OTHER PUBLICATIONS

International Preliminary Report for International Application No. PCT/IB2017/057481 filed on Nov. 29, 2017 on behalf of Pirelli Tyre S.P.A dated Oct. 30, 2018 5 pages.
International Search Report for International Application No. PCT/IB2017/057481 filed on Nov. 29, 2017 on behalf of Pirelli Tyre S.P.A dated Mar. 5, 2018 3 pages.
International Search Report for IT Priority IT102016000121323 filed on Nov. 10, 2017 on behalf of Pirelli Tyre S.P.A. dated Jun. 30, 2017.
Written Opinion for International Application No. PCT/IB2017/057481 filed on Nov. 29, 2017 on behalf of Pirelli Tyre S.P.A dated Mar. 5, 2018 7 pages.
Chinese First Office Action and Search Report for CN Application No. 201780072084.1 dated Nov. 29, 2017 on behalf of Pirelli Tyre. S.P.A. dated Jan. 26, 2021 (English + Original) 23 pages.
Indonesian Office Action for Indonesian Application No. PID201904348 dated Nov. 29, 2017 on behalf of Pirelli Tyre S.P.A. dated Feb. 16, 2021 (Partial English + Original) 3 pages.
Russian Office Action and Search Report for RU Application No. 2019119006/05 dated Nov. 29, 2017 on behalf of Pirelli Tyre S.P.A. dated Feb. 3, 2021 (English + Original) 12 pages.
Sitisaiyidah S. et al., "Upscaling of a Batch De-Vulcanization Process for Ground Car Tire Rubber to a Continuous Process in a Twin Screw Extruder" *Materials*, vol. 9(724),Aug. 2016, pp. 1-17.
Xu Q. et al., "Hydraulic Vulcanizing Machine and Curing Process for OTR Tire" Rubber Science and Technology, Feb. 2015, pp. 45-48 (English Abstract + Original).
Zou T. "Adjust technology of closing force for B type dual mode shaping curing press for radial tyre" China Rubber/Plastics Technology and Equipment, Jun. 2014, pp. 36-39 (English Abstract + Original).

* cited by examiner

FIG. 1

METHOD, CURING LINE, PROCESSING UNIT AND ASSOCIATED ELECTRONIC UNIT FOR CONTROLLING CURING APPARATUSES FOR TYRE PRODUCTION

CROSS REFERENCE TO RELATED APPLICATIONS

The present application is the U.S. National Stage of International Patent Application No. PCT/IB2017/057481 filed on Nov. 29, 2017 which, in turn, claims priority to EP Application No. 17200962.3 filed on Nov. 10, 2017, and Italian Application No. 102016000121323 filed on Nov. 30, 2016.

The present invention relates to a method for controlling a curing apparatus for tyre production.

The present invention further relates to a curing line operating in accordance with said method.

The present invention relates also to a processing unit adapted to implement said method, as well as an electronic unit included in said processing unit.

A tyre for vehicle wheels generally comprises a carcass structure including at least one carcass ply having respectively opposite ends flaps in engagement with respective annular anchoring structures, generally referred to as "bead cores", integrated into the regions usually identified as "beads", the inside diameter of which substantially matches a so-called "fitting diameter" of the tyre for fitting it onto a respective rim. The tyre also comprises a crown structure including at least one belt strip located in a radially external position relative to the carcass ply, and a tread band which is radially external to the belt strip. Between the tread band and the belt strip(s) a so-called "underlayer" of elastomeric material may be interposed, the properties of which are suitable for ensuring a stable union between the belt strip(s) and the tread band. In addition, respective sidewalls of elastomeric material are applied to the side surfaces of the carcass structure, each extending from one of the side edges of the tread band up to the respective annular bead anchoring structure. In tyres of the "tubeless" type, the carcass ply is internally coated with a layer of elastomeric material, preferably a butyl-based one, commonly referred to as "liner", which has optimal air tightness properties and extends from one bead to the other.

The term "elastomeric material" refers to a composition comprising at least one elastomeric polymer and at least one reinforcing filler. Preferably, said composition also comprises additives such as, for example, a cross-linking agent and/or a plasticizer. Due to the presence of the cross-linking agent, said material can be cross-linked by heating to form the final product.

A "structural component" is meant to be any tyre component assembled or built in strip form having one or more reinforcing cords (carcass ply(ies), belt strip(s), etc.).

The "CT" distance parameter of a structural component refers to the distance, measured on a radial section, from the centre of the forming drum to the axially and radially internal edge of the structural component.

In tyre production, a building process in which the various components of the tyre are made and/or assembled is followed by a moulding and curing process aimed at stabilizing the tyre structure according to a desired geometric configuration, e.g. characterized by a particular tread pattern.

For this purpose, the tyre is introduced into a curing apparatus—also referred to as curing mould—normally comprising a pair of sidewall plates which can be axially moved towards each other, and which are adapted to work on the bead and sidewalls of the tyre, and at least one crown of sectors which are circumferentially distributed and which can be moved radially inwards in order to work on the tread band of the tyre. More specifically, the sidewall plates and the sectors are mutually movable between an open condition, wherein they are spaced apart to allow loading the tyres to be processed, and a closed condition, wherein they define a moulding cavity shaped in accordance with the desired geometric configuration of the outer surfaces of the tyre to be obtained.

Document CN 104875303 describes an automatic mould adjusting method and a tyre vulcanizer, said method comprising: (a) setting a standard mould height value H in a control unit of the vulcanizer, wherein the standard mould height value H is a distance between a fixed height position on the vulcanizer and an upper side plate of a standard mould; (b) replacing a tyre mould; (c) measuring an actual height value H1 from a fixed height position to an upper side plate of the replaced tyre mould, and transmitting the actual height H1 into the control unit; (d) considering H1 and H, driving a driving cylinder to drive the tyre mould to move by means of the control unit, wherein the movement distance delta H is equal to absolute value (H-H1).

The Applicant has observed that several members of the curing apparatus must be moved in the presence of the green tyre in order to properly position the latter and carry out the curing process.

The Applicant has also observed that no data describing the structural and geometric characteristics of a green tyre are usually available: the only accurate information available relates to the specifications of the finished (cured) tyre, which are of course very different from those of the initial green tyre.

The Applicant has then verified that, since the structural characteristics of the green tyre are not systematically available and taken into account, the members of the curing apparatus may not always be moved with the required precision in the presence of the green tyre. The Applicant has also verified that this may result in undesired accidental contact between the members of the curing apparatus and the green tyre, which may cause damage to the latter.

The Applicant has observed that the above-mentioned document CN 104875303 contains no useful teaching for facing and solving the above-described problems. In particular, this document provides no indications about the determination and use, when setting operating parameters of a curing apparatus, of the parameters describing the structural/geometric characteristics of the green tyres to be moulded and cured.

The Applicant has thus perceived that, in order to overcome the above-mentioned problems, it is necessary to automate the activity of defining the operating parameters of the curing apparatuses, taking into account all those factors that may imply the need for adjustments/settings in a curing apparatus.

According to the Applicant perception the definition of the operating parameters of the curing apparatuses must also be substantially the same for apparatuses with the same structural characteristics to be used for manufacturing the same tyre model.

More specifically, the Applicant has found that the computation of the operating parameters of a curing apparatus can advantageously be made as a function of parameters describing the green tyre to be processed by the apparatus, and as a function of structural parameters of the apparatus itself. In particular, the parameters describing the green tyre comprise at least an axial height of said green tyre; the structural parameters of the curing apparatus comprise parameters representative of the dimensions of said apparatus; the operating parameters of the curing apparatus comprise one or more parameters representative of positions taken, during the curing process, by movable members included in the curing apparatus.

In accordance with a first aspect, the invention relates to a method for controlling curing apparatuses for tyre production.

Preferably, said curing apparatuses are adapted to work on green tyres to obtain corresponding finished tyres.

Preferably, initial parameters are acquired through a processing unit.

Preferably, said initial parameters are descriptive of at least one of the shape and the dimensions of said finished tyres.

Preferably, said initial parameters are descriptive of the shape and dimensions of said finished tyres.

Preferably, first parameters are computed through said processing unit.

Preferably, said first parameters are descriptive of said green tyres.

Preferably, said first parameters are computed as a function of said initial parameters.

Preferably, said first parameters comprise at least one parameter representative of an axial height of said green tyres.

Preferably, second parameters are acquired through said processing unit.

Preferably, said second parameters are descriptive of said curing apparatuses.

Preferably, said second parameters comprise one or more parameters representative of dimensions of said curing apparatuses.

Preferably, third parameters are computed through said processing unit.

Preferably, said third parameters are computed as a function of said first parameters.

Preferably, said third parameters are computed as a function of said second parameters.

Preferably, said third parameters are computed as a function of said first parameters and said second parameters.

Preferably, said third parameters comprise one or more parameters representative of positions taken by movable members included in said curing apparatuses.

Preferably, control signals are generated through said processing unit.

Preferably, said control signals are generated as a function of said third parameters.

Preferably, said control signals are generated for controlling the movable members of said curing apparatuses and for obtaining said finished tyres starting from said green tyres.

Preferably, said control signals are sent from said processing unit to said curing apparatuses.

The Applicant believes that, by so doing, the operating parameters of the curing apparatus can be obtained in a fast, accurate and reliable manner.

The accuracy of the results thus obtained will also allow applying the parameters computed for a given apparatus to another apparatus having a similar structure, which is beneficial in terms of time and homogeneity of the finished products.

In accordance with another aspect, the invention relates to a curing line.

Preferably, said curing line comprises a plurality of curing apparatuses.

Preferably, said curing apparatuses are adapted to work on green tyres to obtain corresponding finished tyres.

Preferably, said curing apparatuses comprise movable members.

Preferably, said curing line comprises a processing unit for controlling said curing apparatuses.

Preferably, said processing unit is configured for acquiring initial parameters descriptive of at least one of the shape and the dimensions of said finished tyres.

Preferably, said initial parameters are descriptive of the shape and dimensions of said finished tyres.

Preferably, said processing unit is configured for computing first parameters.

Preferably, said processing unit is configured for computing said first parameters as a function of said initial parameters.

Preferably, said first parameters are descriptive of said green tyres.

Preferably, said first parameters comprise at least one parameter representative of an axial height of said green tyres.

Preferably, said processing unit is configured for acquiring second parameters.

Preferably, said second parameters are descriptive of said curing apparatuses.

Preferably, said second parameters comprise one or more parameters representative of dimensions of said curing apparatuses.

Preferably, said processing unit is configured for computing third parameters.

Preferably, said processing unit is configured for computing said third parameters as a function of said first parameters.

Preferably, said processing unit is configured for computing said third parameters as a function of said second parameters.

Preferably, said processing unit is configured for computing said third parameters as a function of said first parameters and said second parameters.

Preferably, said third parameters comprise one or more parameters representative of positions taken by movable members included in said curing apparatuses.

Preferably, said processing unit is configured for generating control signals.

Preferably, said processing unit is configured for generating said control signals as a function of said third parameters.

Preferably, said processing unit is configured for generating said control signals for controlling the movable members of said curing apparatuses and for obtaining said finished tyres starting from said green tyres.

Preferably, said processing unit is configured for sending said control signals to said curing apparatuses.

In accordance with a further aspect, the invention relates to an electronic unit.

Preferably, said electronic unit is associable with a plurality of curing apparatuses.

Preferably, said curing apparatuses are adapted to work on green tyres to obtain corresponding finished tyres.

Preferably, said electronic unit is configured for acquiring initial parameters.

Preferably, said initial parameters are descriptive of at least one of the shape and the dimensions of said finished tyres.

Preferably, said initial parameters are descriptive of the shape and dimensions of said finished tyres.

Preferably, said electronic unit is configured for computing first parameters.

Preferably, said electronic unit is configured for computing said first parameters as a function of said initial parameters.

Preferably, said first parameters are descriptive of said green tyres.

Preferably, said first parameters comprise at least one parameter representative of an axial height of said green tyres.

Preferably, said electronic unit is configured for acquiring second parameters.

Preferably, said second parameters are descriptive of said curing apparatuses.

Preferably, said second parameters comprise one or more parameters representative of dimensions of said curing apparatuses.

Preferably, said electronic unit is configured for computing third parameters.

Preferably, said electronic unit is configured for computing said third parameters as a function of said first parameters.

Preferably, said electronic unit is configured for computing said third parameters as a function of said second parameters.

Preferably, said electronic unit is configured for computing said third parameters as a function of said first parameters and said second parameters.

Preferably, said third parameters comprise one or more parameters representative of positions taken by movable members included in said curing apparatuses.

Preferably, said electronic unit is configured for generating one or more output signals incorporating said third parameters.

In accordance with a different aspect, the invention relates to a processing unit.

Preferably, said processing unit is configured for generating control signals.

Preferably, said processing unit is configured for generating said control signals as a function of said third parameters.

Preferably, said processing unit is configured for generating control signals for controlling the movable members of said curing apparatuses and for obtaining said finished tyres starting from said green tyres.

Preferably, said processing unit is configured for sending said control signals to said curing apparatuses.

In at least one of the above aspects, the present invention may have at least one of the following preferred features.

Preferably, the acquisition of said initial parameters is effected by receiving said initial parameters.

Preferably, the acquisition of said initial parameters is effected by reading said initial parameters from a first memory area.

Preferably, said first memory area is associated with said electronic unit.

Preferably, said first memory area is associated with said processing unit.

Preferably, said initial parameters comprise a fitting parameter.

Preferably, said initial parameters comprise a positioning parameter for at least one forming drum.

Preferably, said initial parameters comprise a distance parameter "CT" for each one of the structural components of said finished tyres.

Preferably, said initial parameters comprise one or more parameters representative of the typology of structural components belonging to said finished tyres.

Preferably, said initial parameters comprise one or more parameters representative of the number of structural components, for each typology, belonging to said finished tyres.

Preferably, said initial parameters comprise a parameter representative of a height of at least one filling element belonging to said finished tyres.

Preferably, intermediate parameters are computed in order to compute said first parameters.

Preferably, said intermediate parameters are computed as a function of said initial parameters.

Preferably, said intermediate parameters are representative of at least one of the shape and the dimensions of a carcass structure of said green tyres in which the end flaps of the carcass ply(ies) have not yet been turned around each bead wire.

Preferably, said intermediate parameters are representative of the shape and dimensions of a carcass structure of said green tyres in which the end flaps of the carcass ply(ies) have not yet been turned around each bead wire.

Preferably, said first parameters are computed as a function of said intermediate parameters.

Preferably, said first parameters comprise a parameter representative of an axial height of that portion of said green tyres which protrudes from respective support trays supporting said green tyres.

Preferably, the determination of said second parameters is effected by receiving said second parameters.

Preferably, the determination of said second parameters is effected by reading said second parameters from a first memory area.

Preferably, the determination of said second parameters is effected by receiving said second parameters and reading said second parameters from a first memory area.

Preferably, said second memory area is associated with said electronic unit.

Preferably, said second memory area is associated with said processing unit.

Preferably, said second parameters comprise a distance parameter representative of a distance between the inner beads of a mould belonging to at least one of said curing apparatuses.

Preferably, said second parameters comprise a length parameter representative of a length of a chord of said mould.

Preferably, said second parameters comprise one or more dimensional parameters representative of dimensions of curing chambers belonging to said curing apparatuses.

Preferably, said movable members comprise loading devices adapted to position said green tyres into said moulds.

Preferably, said third parameters comprise one or more parameters representative of positions taken by said loading devices while picking up, in a first position, said green tyres from the respective support trays.

Preferably, said third parameters comprise one or more parameters representative of positions taken by said loading devices while laying, in a second position, said green tyres into said moulds.

Preferably, said third parameters comprise one or more parameters representative of positions taken by said loading devices while moving between said first position and said second position.

Preferably, said movable members comprise unloading devices adapted to remove said finished tyres from said moulds.

Preferably, said third parameters comprise one or more parameters representative of positions taken by said unloading devices while picking up, in a third position, said finished tyres from said moulds.

Preferably, said third parameters comprise one or more parameters representative of positions taken by said unloading devices while laying, in a fourth position, said finished tyres onto conveyor devices for moving them away from said curing apparatuses.

Preferably, said third parameters comprise one or more parameters representative of positions taken by said unloading devices while moving between said third position and said fourth position.

Preferably, said movable members comprise components of said moulds.

Preferably, said third parameters comprise one or more parameters representative of positions taken by components of said moulds during a series of steps of the curing processes carried out by said curing apparatuses.

Preferably, during each step of said series of steps, sectors of at least one of said moulds are located in different positions.

Preferably, said third parameters comprise one or more parameters representative of positions taken by said movable members in order to carry out multi-stage curing.

Preferably, said third parameters comprise one or more parameters representative of positions taken by said movable members in order to carry out post-curing inflation.

Preferably, in order to compute said third parameters as a function of said first parameters and said second parameters, a plurality of operating parameters are computed.

Preferably, said operating parameters are computed through said processing unit.

Preferably, said operating parameters are computed as a function of said first parameters.

Preferably, said operating parameters are computed as a function of said second parameters.

Preferably, said operating parameters are computed as a function of said first parameters and said second parameters.

Preferably, said third parameters are computed as a function of said operating parameters.

Preferably, said third parameters are determined as a function of said first parameters, said second parameters and said operating parameters.

Preferably, said operating parameters comprise a first operating parameter representative of a height of the containment structure adapted to contain said moulds.

Preferably, said operating parameters comprise a second operating parameter representative of a level at which said sectors are kept stationary for a preset period of time during the execution of the curing process.

Preferably, said operating parameters comprise a third parameter representative of positions of lower sidewall plates belonging to said moulds relative to references integral with said lower sidewall plates.

Preferably, said operating parameters comprise a fourth parameter representative of a level of middle planes of said moulds relative to reference levels when said moulds are housed in said containment structures.

Preferably, said operating parameters comprise a fifth operating parameter representative of positions taken by upper sidewall plates belonging to said moulds during steps of closing said moulds.

Preferably, said operating parameters comprise a sixth operating parameter representative of positions of said upper sidewall plates relative to references integral therewith.

Preferably, said operating parameters comprise one or more seventh operating parameters representative of travels of vertically movable members belonging to said curing apparatuses.

Preferably, said operating parameters comprise an eighth operating parameter representative of a height of said moulds measured when said sectors are in a predetermined position.

Preferably, said operating parameters comprise a subset.

Preferably, said subset comprises the first operating parameter.

Preferably, said subset comprises the second operating parameter.

Preferably, said subset comprises the fourth operating parameter.

Preferably, said subset comprises the eighth operating parameter.

Preferably, said subset is associated with an identification code.

Preferably, said identification code is representative of one or more of said containment structures.

Preferably, said one or more containment structures represented by said identification code have dimensions described by the parameters included in said subset.

Preferably, a plurality of identification codes are stored, each one associated with a respective subset of parameters.

Preferably, said plurality of identification codes are stored into said second memory area.

Preferably, the identification code associated with one or more of said containment structures is inputted to said processing unit.

Preferably, the subset associated with said identification code is taken from said second memory area through said processing unit.

Preferably, said taken subset of parameters is used for computing said third parameters.

Preferably, said third parameters are determined as a function of a set of machine parameters.

Preferably, said machine parameters are descriptive of dimensions of said curing apparatuses and independent of said containment structures.

Preferably, said machine parameters are descriptive of levels of said curing apparatuses and independent of said containment structures.

Preferably, said machine parameters are descriptive of dimensions and levels of said curing apparatuses and independent of said containment structures.

Preferably, said processing unit comprises a plurality of control devices.

Preferably, each control device is associated with a respective one of said curing apparatuses.

Preferably, each one of said control devices is configured for acquiring the third parameters associated with the respective curing apparatus.

Preferably, each one of said control devices is configured for generating one or more of said control signals to be sent to said respective curing apparatus.

Further features and advantages will become more apparent in the light of the following detailed description of a preferred but non-limiting embodiment of the invention. Reference will be made in the following description to the annexed drawings, which are also provided by way of illustrative and non-limiting example, wherein.

With reference to the annexed drawings, 100 designates as a whole a curing apparatus for tyre production.

The curing apparatus 100 is used in order to obtain, starting from a green tyre T1, a finished tyre T2.

Preferably, the curing apparatus 100 (FIG. 3) comprises a mould 140, adapted to give the desired shape to the finished tyre T2.

Figure 3:
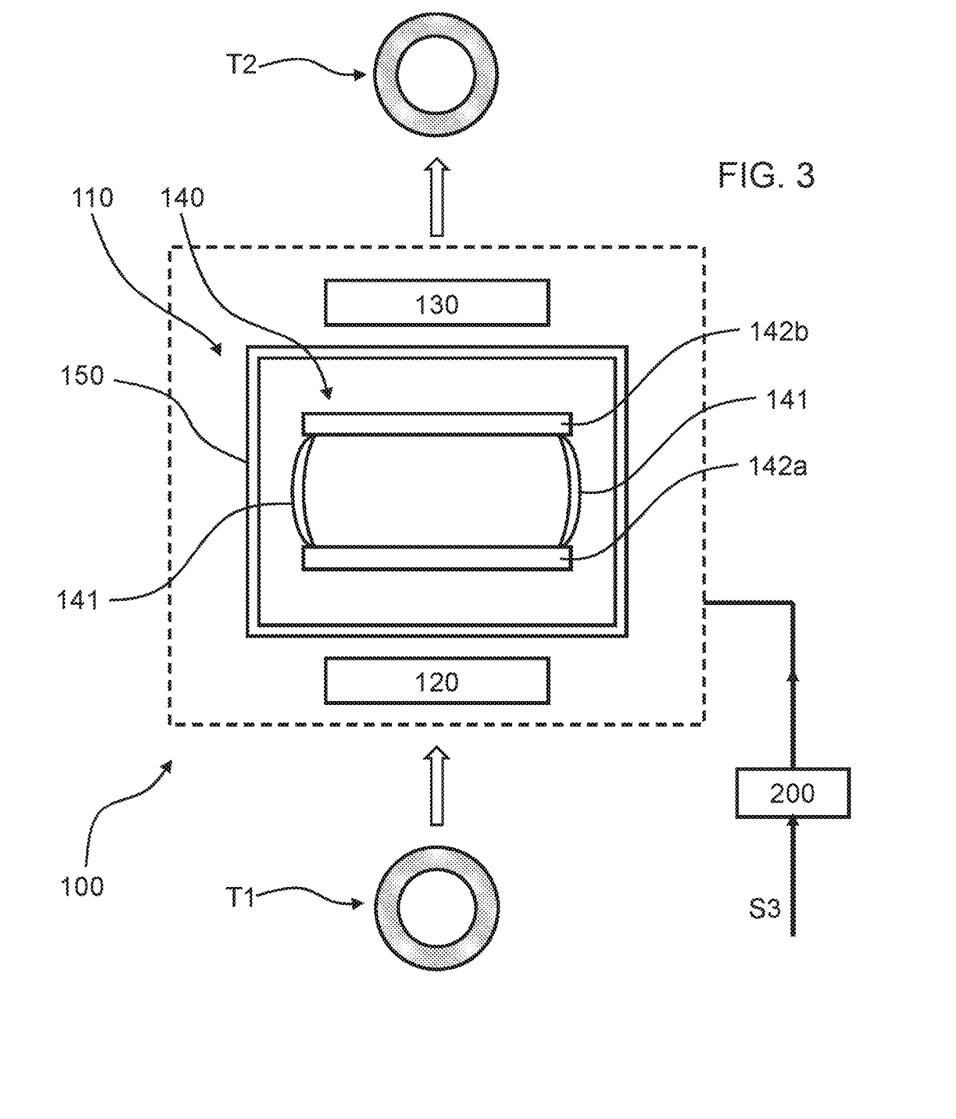
FIG. 3 shows a block diagram of a curing apparatus in accordance with the present invention, included in the curing line of FIG. 1.

Preferably, the mould 140 comprises a lower sidewall plate 142a and an upper sidewall plate 142b, which can be axially moved towards each other, and which are adapted to work on the bead and sidewalls of the tyre.

Preferably, the mould 140 comprises a plurality of sectors 141, which are circumferentially distributed and which can be moved radially inwards in order to work on the tread band of the tyre.

More specifically, the sectors 141 and the sidewall plates 142a, 142b are mutually movable between an open condition, wherein they are spaced apart to allow loading the tyres to be processed, and a closed condition, wherein they define a moulding cavity shaped in accordance with the desired geometric configuration of the outer surfaces of the finished tyre to be obtained.

Preferably, the curing apparatus 100 comprises a plurality of movable members 110 working on the green tyre T1 and/or on the tyre T2 during the curing process.

Preferably, the movable members 110 comprise a loading device 120 adapted to position the green tyre T1 into the mould 140.

Preferably, the movable members 110 comprise an unloading device 130 adapted to remove the finished tyre T2 from the mould 140 at the end of the curing process.

Preferably, the movable members 110 comprise components of the mould 140, such as, for example, said sectors 141 and the sidewall plates 142a, 142b.

Preferably, the curing apparatus 100 comprises a containment structure 150 adapted to contain and support the mould 140.

Note that the curing apparatus 100 may also comprise many other members/devices, such as, for example, actuators for moving said movable members 110, which will not be described in detail herein since they are per se known.

Preferably, the curing apparatus 100 is controlled by a respective control device 200, which controls the operation of the curing apparatus 100 and of the components thereof.

The control device 200 may consist of, comprise or be included in a PLC suitably programmed for the curing process to be carried out.

As will become apparent below, the control device 200 receives the working parameters for the curing apparatus 100 from an electronic unit 500.

Figure 1:
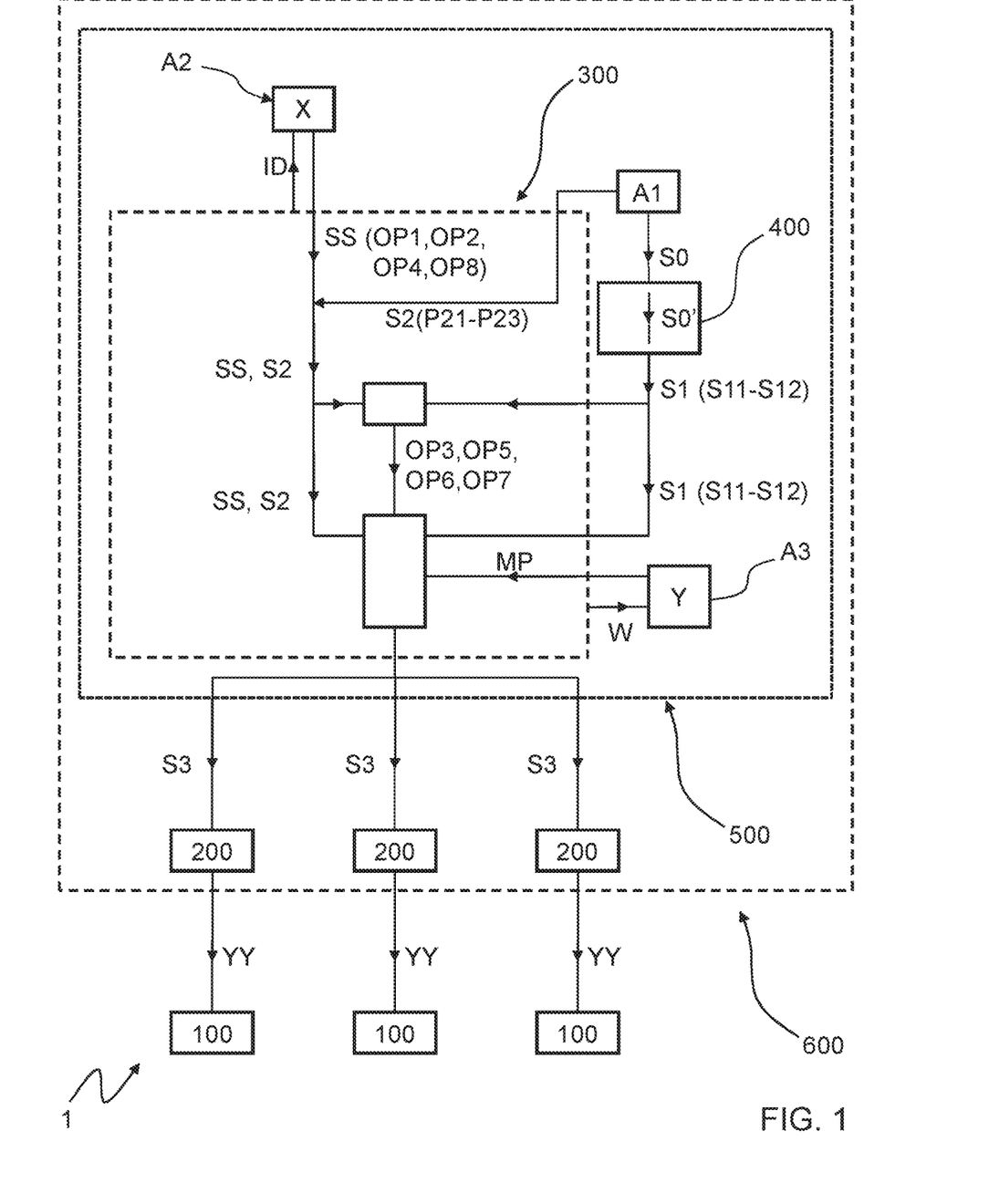
FIG. 1 shows a block diagram of a curing line in accordance with the present invention.

FIG. 1 schematically represents a curing line 1 comprising a plurality of curing apparatuses 100, a plurality of respective control devices 200, and the electronic unit 500.

The electronic unit 500 and the control devices 200 may constitute a processing unit 600, also schematically shown in FIG. 1.

Through the processing unit 600, control signals YY for driving the movable members 110 of the curing apparatuses 100 are sent to the various curing apparatuses 100.

The following description will tackle the determination of the parameters required for the control signals YY dedicated to one or more of said curing apparatuses 100.

More specifically, in the case wherein there are multiple substantially identical curing apparatuses 100 that must produce the same finished tyres, then the same control signals can be provided to such curing apparatuses. In other words, in this case it will not be necessary to repeat the computation of the parameters for all other curing apparatuses 100 after having carried out said computation once.

Otherwise, in the case of different curing apparatuses 100 and/or different finished tyres T2 to be manufactured, the computation will have to be repeated at least partly.

According to the invention, first parameters S1 are preferably determined, which are descriptive of the green tyre T1 to be made by means of the curing apparatus 100.

Preferably, the first parameters S1 comprise at least one parameter P11 representative of an axial height of the green tyre T1.

In one embodiment, the first parameters S1 may also comprise a parameter P12 representative of an axial height of that portion of said green tyre T1 which protrudes from a support tray supporting the green tyre T1 before it is loaded into the curing apparatus 100.

Preferably, second parameters S2 are also determined, which describe the curing apparatus 100.

The second parameters S2 comprise one or more parameters representative of dimensions of the curing apparatus 100.

As will become apparent below, the first parameters S1 and the second parameters S2 are used for computing third parameters S3, consisting of the parameters that are supplied to the control device 200 for controlling the curing apparatus 100.

Preferably, the second parameters S2 may comprise a distance parameter P21 representative of a distance between the inner beads of the mould 140.

Preferably, the second parameters S2 may comprise a length parameter P22 representative of a length of a chord of the mould 140. Preferably, the second parameters S2 may comprise one or more dimensional parameters P23 representative of dimensions of a curing chamber belonging to the curing apparatus 100.

The second parameters S2 may be read from a first memory area A1. Said first memory area may advantageously store the so-called "specification" or "recipe", i.e. the dataset that is typically defined for the production of a finished tyre.

In addition or as an alternative, the second parameters may be received from another device/apparatus.

As far as the first parameters S1 are concerned, they may be obtained starting from initial parameters S0 descriptive of at least one of the shape and the dimensions of the finished tyre T2.

Preferably, the initial parameters S0 are representative of both the shape and the dimensions of the finished tyre T2.

Preferably, the initial parameters S0 are stored into the first memory area A1.

The initial parameters S0 may thus be included in the above-mentioned "specification" or "recipe".

Preferably, the initial parameters S0 comprise one or more of: a fitting parameter P01; a positioning parameter P02 for a forming drum used for manufacturing the green tyre T1; a distance parameter "CT" P03 for each one of the structural components of the finished tyre T2; one or more parameters P04 representative of the typology of structural components belonging to the finished tyre T2; one or more parameters P05 representative of the number of structural components, for each typology, belonging to the finished tyre T2; a parameter P06 representative of a height of a filling element belonging to the finished tyre T2.

Preferably, intermediate parameters S0' are computed as a function of the initial parameters S0.

The intermediate parameters S0' are representative of at least one of the shape and the dimensions of a carcass structure of the green tyre T1 in which the end flaps of the carcass ply(ies) have not yet been turned around each bead wire.

The intermediate parameters S0' are preferably descriptive of a carcass sleeve and a crown sleeve to be used for assembling the green tyre T1, which in turn will allow obtaining, by means of a curing and moulding process, the finished tyre T2.

A first group of intermediate parameters S0' is descriptive of said carcass sleeve; a second group of intermediate parameters S0' is descriptive of said crown sleeve.

Preferably, the first group of intermediate parameters S0' is obtained as a function of a mathematical model (hereafter referred to as second mathematical model MM2) and, as aforesaid, of the initial parameters S0.

The second mathematical model MM2 may be based on the specification of the finished tyre T2, i.e. on the technologic and geometric characteristics thereof: single-ply or dual-ply tyre, bead wire type, presence or absence of sidewall inserts for run-flat operation (run-flat tyre), presence or absence of a self-sealing layer (self-sealing tyre), presence and type of any reinforcements, geometrical dimensions of the tyre (e.g. fitting diameter, maximum axial dimension, sidewall height), etc.

Preferably, the first group of intermediate parameters S0' comprises at least one parameter descriptive of an outside diameter of the carcass sleeve.

Preferably, the first group of initial parameters S0' comprises a positioning parameter for a forming drum used for manufacturing the green tyre T1.

Preferably, the first group of intermediate parameters S0' comprises a distance parameter for each one of the structural components of the carcass sleeve.

By way of example, the diameter of the drum to be used for making the carcass sleeve, and hence the diameter of the carcass sleeve, are determined on the basis of the fitting diameter of the finished tyre. Moreover, depending on the dimensions of the radial section of the finished tyre, it is possible to determine the width of the ply(ies) that make up the carcass sleeve, measured along the direction of longitudinal development of said drum. Preferably, when computing said width also an axial stretch undergone by said ply(ies) while assembling the tyre is taken into account.

Preferably, the second mathematical model MM2 further comprises parameters describing a step of turning the axial ends of the carcass ply(ies), e.g. determined experimentally on the basis of previous similar operations carried out by means of the same machinery. In this way it is possible to define the profile that the crown sleeve (which up to this point is only partially made) may have after said ends of the ply(ies) have been turned around the respective bead wires.

Preferably, the second mathematical model MM2 further comprises parameters descriptive of laying, in a radially external position relative to the turned ply(ies), additional structural components, which will have a radially external profile wholly similar to the one defined by the turned ply(ies).

Preferably, the second group of intermediate parameters S0' is obtained as a function of a mathematical model (hereafter referred to as third mathematical model MM3) and, as aforesaid, of the initial parameters S0.

Preferably, the second group of intermediate parameters S0' comprises at least one parameter descriptive of an inside diameter of the crown sleeve.

The third mathematical model MM3 is preferably based, at least partly, on the determination of the solid/void ratio in the pattern of the tread band and on the resulting computation of the characteristics and/or dimensions of a tread band in the green state, which, when subjected to a moulding and curing process, will show the desired tread pattern.

By way of example, through the third mathematical model MM3 the deposition diameter of the belt strip(s) and the diameter of the drum whereon the crown sleeve is made are computed starting from the outside diameter of the finished tyre.

Preferably, the third mathematical model MM3 also allows determining, based on the width (measured in a direction parallel to the axis of the tyre) of the tread band, of the belt strip(s), of the underlayer, and of the zero-degree layer that are present in the finished tyre, the width (measured in a direction parallel to the axis of the drum whereon the crown sleeve is made) of the corresponding structural components of the crown sleeve.

Preferably, during the green tyre assembly process, the crown sleeve is associated with said carcass sleeve.

Preferably, a mathematical model (first mathematical model MM1) is provided, e.g. retrieved from a memory area, which is descriptive of the green tyre assembly process.

During said process, the carcass sleeve is so shaped as to adhere to the radially internal surface of the crown sleeve.

Preferably, the shaping of the carcass sleeve is essentially carried out in two steps:

a step of inflating the carcass sleeve, aimed at increasing the radial dimension of the latter, until it reaches the radially internal surface of the crown sleeve; and a step of bringing the axial ends of the carcass sleeve close to each other.

Advantageously, the first mathematical model MM1 puts the axial dimension of the green tyre in relation with the difference between the inside diameter of the crown sleeve and the outside diameter of the carcass sleeve.

In other words, the first mathematical model MM1 allows correlating the radial deformation of the carcass sleeve with the axial deformation of the carcass sleeve.

The first mathematical model MM1 may, for example, be based on the following relation:

$$\rho \cdot y = \text{constant}$$

where, for each point of the section of the tyre being processed in a radial plane (i.e. in a plane containing the axis of rotation of the tyre being processed), $\rho$ represents the radius of curvature, and y represents the distance from a straight line parallel to the axis of rotation of the tyre being processed and tangent to the radially internal points of the beads of the same.

By applying said first mathematical model MM1, it is thus possible to obtain the first parameters S1 descriptive of the green tyre as a function of the first and second groups of intermediate parameters S0'.

Preferably, a plurality of operating parameters OP are computed as a function of the first parameters S1 and the second parameters S2.

The operating parameters OP will then preferably be used for computing the third parameters S3.

Preferably, the operating parameters OP comprise one or more of:

a first operating parameter OP1 representative of a height of the containment structure 150;

a second operating parameter OP2 representative of a level at which the sectors 141 are kept stationary for a preset period of time during the execution of the curing process; preferably, said level is maintained both during the mould closing stage, when the tyre is still green, and during the mould opening stage, when the tyre has been cured;

a third operating parameter OP3 representative of a position of the lower sidewall plate 142a relative to a reference integral with the lower sidewall plate 142a;

a fourth operating parameter OP4 representative of a level of a middle plane of the mould 140 relative to a reference level when the mould 140 is housed in the containment structure 150;

a fifth operating parameter OP5 representative of a position taken by the upper sidewall plate 142b during a step of closing the mould 140;

a sixth operating parameter OP6 representative of a position of the upper sidewall plate 142b relative to a reference integral therewith;

one or more seventh operating parameters OP7 representative of travels of vertically movable members, i.e. annular elements respectively associated with the lower sidewall plate 142a and the upper sidewall plate 142b;

an eighth operating parameter OP8 representative of a height of the mould 140 measured when the sectors 141 are in a predetermined position.

Preferably, the operating parameters OP comprise a subset SS, comprising one or more of the first operating parameter OP1, the second operating parameter OP2, the fourth operating parameter OP4 and the eighth operating parameter OP8.

The values included in the subset SS can be selected from a suitable table X, stored in a second memory area A2 (FIG. 2), wherein different values are each associated with a respective containment structure. Depending on the dimensions of the green tyre, particularly the axial length thereof, the appropriate containment structure is selected along with the corresponding values of the operating parameters OP1, OP2, OP4 and OP8.

Figure 2:
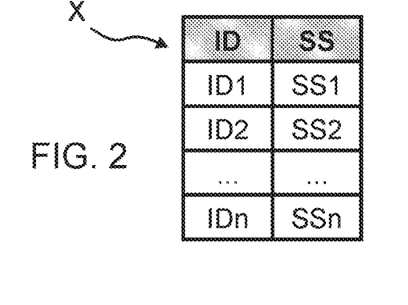
FIGS. 2 and 4 show tables storing data to be used in the method according the present invention.

In FIG. 2, each one of the references ID1-IDn represents an identification code associated with a respective containment structure. Each one of the references SS1-SSn represents, for a respective containment structure, a set comprising at least one of: a value for the first operating parameter OP1, a value for the second operating parameter OP2, a value for the fourth operating parameter OP4, a value for the eighth operating parameter OP8.

By inputting to the table X the identification code ID associated with the containment structure 150 used in the curing apparatus 100, it is possible to obtain the subset SS containing the values for the operating parameters OP1, OP2, OP4, OP8 that describe the containment structure 150.

The subset of parameters SS thus obtained can be used for computing the third parameters S3, as will be illustrated hereinafter.

Preferably, the operating parameters OP not belonging to the subset SS can be determined differently from the values belonging to said subset SS.

The third operating parameter OP3 can be computed as a function of the fourth operating parameter OP4 and the distance parameter P21, e.g. by dividing the distance parameter P21 by a constant and subtracting the result from the fourth operating parameter OP4.

The fifth operating parameter OP5 can be computed as a function of the third operating parameter OP3 and the axial length of the green tyre, e.g. by adding up the two values.

The sixth operating parameter OP6 can be computed as a function of the first operating parameter OP1, the fourth operating parameter OP4 and the distance parameter P21, e.g. by subtracting from the first operating parameter OP1 the fourth operating parameter OP4 and the distance parameter P21 divided by a constant.

One of the seventh operating parameters OP7 can be computed by subtracting an appropriately determined constant from the third operating parameter OP3; said constant may be substantially equal to, for example, the sum of the height, measured in the vertical direction, of a terminal element of a member suitable for holding the upper sidewall plate in position and the thickness of the lower sidewall plate.

As a function of the first parameters S1, the second parameters S2 and the operating parameters OP, the third parameters S3 are then computed.

Preferably, the third parameters S3 are computed also as a function of a set of machine parameters MP.

The machine parameters MP are descriptive of dimensions and/or levels of the curing apparatus 100 that are not dependent on the containment structure 150.

In one embodiment, a third memory area A3 stores a table Y (FIG. 4) containing different sets of machine parameters MP1-MPn. Each set of machine parameters is associated with a respective typology of curing apparatus, represented by a respective identification code W1-Wn.

Figure 4:
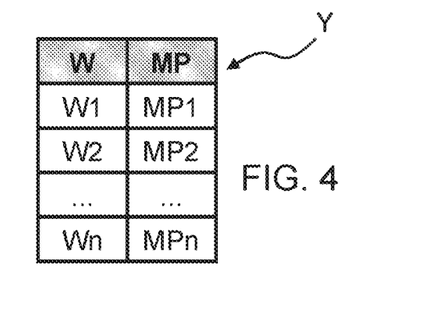

By inputting an identification code W, representative of the curing apparatus 100, to the table Y, it is possible to extract the set of machine parameters MP to be used.

As aforesaid, the third parameters S3 are supplied to the control device 200 for managing the curing apparatus 100.

In the case of substantially identical curing apparatuses 100, which must manufacture identical finished tyres, the same third parameters S3 can be supplied to the respective control devices 200.

The third parameters S3 comprise one or more parameters representative of positions taken by the movable members 110 during the curing process.

Preferably, the third parameters S3 comprise one or more parameters representative of positions taken by the loading device 120 while carrying out one or more of the following operations: picking up, in a first position, the said green tyre T1 from the respective support tray; laying, in a second position, the green tyre T1 into the mould 140; movements between the first position and the second position.

The parameter representative of the position taken by the loading device 120 for picking up the green tyre T1 in the mould 140 can be computed as a function of the axial height of the green tyre T1 and of an appropriately determined constant; said constant may be equal to, for example, a difference between the reference level, corresponding to a plane in which a bottom wall of the containment structure lies, and the level of a plane defined by green tyre supporting members that are present on said tray.

Preferably, the third parameters S3 comprise one or more parameters representative of positions taken by the unloading device 130 while carrying out one or more of the following operations: picking up, in a third position, the finished tyre T2 from the mould 140; laying, in a fourth position, the finished tyre T2 onto a conveyor device for moving it away from the curing apparatus 100; movements between the third position and the fourth position.

The parameter representative of the position taken by the unloading device 130 for laying the finished tyre T2 onto the conveyor device can be computed as a function of the distance parameter P21, the length parameter P22 and an appropriately determined constant; said constant may be equal to, for example, the difference between a reference level, corresponding to a plane in which a bottom wall of the containment structure lies, and a level defined by a sliding belt of said conveyor device, whereon the tyres to be taken away are positioned.

By way of example, the distance parameter P21 divided by a constant, the length parameter divided by a constant, and said constant are added up.

Preferably, the third parameters S3 comprise one or more parameters representative of positions taken by components of the mould 140 during a series of steps of the curing process carried out by said curing apparatus 100.

Preferably, during each step of said series of steps, the sectors 141 of the mould 140 are located in different positions.

In order to compute the parameters representative of said positions taken by components of the mould 140 during the steps of the curing process, the eighth operating parameter OP8 is advantageously employed.

Preferably, the third parameters S3 comprise one or more parameters representative of positions taken by the movable members 110 in order to carry out at least one of multi-stage curing and post-curing inflation.

As aforesaid, the third parameters S3 are computed by the electronic unit 500 and are supplied to the control device(s) 200.

Preferably, the electronic unit 500 comprises a first electronic processing module 300 that, based on the first parameters S1 and the second parameters S2, computes the third parameters S3.

Preferably, the first parameters S1 are supplied by a second electronic processing module 400, which will be described below.

As far as the second parameters S2 are concerned, the first electronic processing module 300 is preferably configured for reading them from the first memory area A1 and/or for receiving them from another device/apparatus.

The first electronic processing module 300 is preferably configured for determining, based on the first parameters S1 and the second parameters S2, said operating parameters OP.

In one embodiment, the electronic processing module 300 is configured for selecting, in the second memory area A2, the subset SS descriptive of the containment structure 150 of the curing apparatus 100. Based on the corresponding identification code ID, the first electronic processing module 300 retrieves from the table X the subset SS associated with said identification code ID.

In this manner, the first operating parameter OP1, the second operating parameter OP2, the fourth operating parameter OP4 and the eighth operating parameter OP8 are preferably determined.

The remaining operating parameters OP3, OP5, OP6 and OP7 can be computed as described above.

Note that the identification code ID may be received by the first electronic processing module 300, or may be determined directly by the first electronic processing module 300 on the basis of, for example, the first parameters S1, particularly the first parameter P11.

The first electronic processing module 300 is preferably also configured for computing the third parameters S3 as a function of the first parameters S1, the second parameters S2 and the operating parameters OP.

Preferably, the electronic unit 500 may comprise a second electronic processing unit 400 configured for determining the first parameters S1 starting from the initial parameters S0.

Preferably, in order to determine the first parameters S1, the second electronic processing module 400 computes, as a function of the initial parameters S0, the intermediate parameters S0', and then, based on the latter, the first parameters S1.

In one embodiment, the second electronic processing module 400 reads the initial parameters S0 from the first memory area A1.

In one embodiment, the second electronic processing module 400 receives the initial parameters S0 from another device/apparatus, which has computed them or retrieved them from a suitable memory area beforehand; the latter may be either the first memory area A1 or another suitably arranged memory area.

The first parameters S1 are then sent to the electronic processing module 300 for the computation of the third parameters S3.

In one embodiment, the electronic unit 500 may consist of, comprise or be included in a PLC suitably programmed for the curing process to be carried out.

In one embodiment, the electronic unit 500 may belong to a device external to said PLC and be connected to the latter in such a way as to be able to provide the appropriate working parameters, such as, for example, the third parameters S3.

As aforesaid, the processing unit 600 is configured for sending control signals YY to one or more curing apparatuses 100.

If the third parameters for a given typology of curing apparatus and finished tyre to be manufactured have already been computed, the processing unit 600 may avoid computing them again, should they be needed.

Otherwise, when the processing unit 600 must compute third parameters S3, preferably via the electronic unit 500, for a curing apparatus—finished tyre combination for which it has not worked yet, it will advantageously be able to carry out the above-described method.

The invention claimed is:

1. A curing line comprising:
   a plurality of curing apparatuses which work on green tyres to obtain corresponding finished tyres, said curing apparatuses comprising said movable members;
   a processing unit controlling said curing apparatuses, said processing unit being programmed for:
   acquiring initial parameters descriptive of at least one of the shape and the dimensions of said finished tyres;
   computing, as a function of said initial parameters, first parameters descriptive of said green tyres, said first parameters comprising at least one parameter representative of an axial height of said green tyres;
   acquiring second parameters descriptive of said curing apparatuses, said second parameters comprising one or more parameters representative of dimensions of said curing apparatuses;
   computing third parameters as a function of said first parameters and said second parameters, said third parameters comprising one or more parameters representative of positions taken by movable members belonging to said curing apparatuses;
   generating, as a function of said third parameters, control signals for controlling the movable members of said curing apparatuses and for obtaining said finished tyres starting from said green tyres;

sending said control signals to said curing apparatuses such that said movable members move in accordance with the control signals when working on green tyres to obtain corresponding finished tyres.

2. The curing line according to claim 1, wherein said movable members comprise a loading device adapted to position said green tyres into a mould.

3. The curing line according to claim 2, wherein said third parameters comprise one or more parameters representative of positions taken by said loading device while carrying out one or more of the following operations: picking up, in a first position, said green tyre from a respective support tray; laying, in a second position, said green tyre into said mould; movements between said first position and said second position.

4. The curing line according to claim 2, wherein said movable members comprise an unloading device adapted to remove said finished tyre from said mould.

5. The curing line according to claim 4, wherein said third parameters comprise one or more parameters representative of positions taken by said unloading device while carrying out one or more of the following operations: picking up, in a third position, said finished tyre from said mould; laying, in a fourth position, said finished tyre onto a conveyor device for moving it away from said curing apparatus; movements between said third position and said fourth position.

6. The curing line according to claim 2, wherein said movable members comprise components of said mould.

7. The curing line according to claim 6, wherein said third parameters comprise one or more parameters representative of positions taken by said components of said mould during a series of steps of the curing process carried out by said curing apparatus.

8. An electronic unit associable with a plurality of curing apparatuses, said curing apparatuses being adapted to work on green tyres to obtain corresponding finished tyres, said electronic unit being programmed for:

acquiring initial parameters descriptive of at least one of the shape and the dimensions of said finished tyres;

computing, as a function of said initial parameters, first parameters descriptive of said green tyres, said first parameters comprising at least one parameter representative of an axial height of said green tyres;

acquiring second parameters descriptive of said curing apparatuses, said second parameters comprising one or more parameters representative of dimensions of said curing apparatuses;

computing third parameters as a function of said first parameters and said second parameters, said third parameters comprising one or more parameters representative of positions taken by movable members belonging to said curing apparatuses;

generating, as a function of said third parameters, control signals for controlling the movable members of said curing apparatuses and for obtaining said finished tyres starting from said green tyres; and sending said control signals to said curing apparatuses such that the movable members move in accordance with said control signals when working on green tyres to obtain corresponding finished tyres.

9. The processing unit according to claim 8, further comprising a plurality of control devices, each one associated with a respective one of said curing apparatuses, wherein each one of said control devices is programmed for acquiring the third parameters associated with the respective curing apparatus, and for generating one or more of said control signals to be sent to said respective curing apparatus.

10. The processing unit according to claim 8, wherein said movable members comprise an unloading device adapted to remove said finished tyre from a mould.

11. The processing unit according to claim 10, wherein said third parameters comprise one or more parameters representative of positions taken by said unloading device while carrying out one or more of the following operations: picking up, in a third position, said finished tyre from said mould; laying, in a fourth position, said finished tyre onto a conveyor device for moving it away from said curing apparatus; movements between said third position and said fourth position.

12. The processing unit according to claim 10, wherein said movable members comprise components of said mould.

13. The processing unit according to claim 12, wherein said third parameters comprise one or more parameters representative of positions taken by said components of said mould during a series of steps of the curing process carried out by said curing apparatus.

* * * * *